United States Patent
Vincent et al.

(10) Patent No.: US 9,542,612 B2
(45) Date of Patent: *Jan. 10, 2017

(54) USING EXTRACTED IMAGE TEXT

(71) Applicant: Google Inc., Mountain View, CA (US)

(72) Inventors: Luc Vincent, Palo Alto, CA (US); Adrian Ulges, Rhineland-Palatinate (DE)

(73) Assignee: Google Inc., Mountain View, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 14/994,638

(22) Filed: Jan. 13, 2016

(65) Prior Publication Data

US 2016/0125254 A1    May 5, 2016

Related U.S. Application Data

(60) Continuation of application No. 14/291,331, filed on May 30, 2014, now Pat. No. 9,269,013, which is a
(Continued)

(51) Int. Cl.
*G06K 9/18* (2006.01)
*G06K 9/32* (2006.01)
(Continued)

(52) U.S. Cl.
CPC ........... *G06K 9/3258* (2013.01); *G06K 9/36* (2013.01); *G06K 9/4661* (2013.01); *G06K 9/52* (2013.01);
(Continued)

(58) Field of Classification Search
CPC ...... G06K 9/3258; G06K 9/36; G06K 9/4661; G06K 9/52; G06K 2009/4666; G06T 3/4053; G06T 7/0028; G06T 11/60
See application file for complete search history.

(56) References Cited

U.S. PATENT DOCUMENTS

| | | | |
|---|---|---|---|
| 5,828,793 A | 10/1998 | Mann | |
| 5,914,744 A * | 6/1999 | Ng | B41J 2/435 347/237 |

(Continued)

FOREIGN PATENT DOCUMENTS

| | | |
|---|---|---|
| JP | 2001-218134 | 8/2001 |
| KR | 10-1994-0020246 | 9/1994 |
| KR | 10-2002-0006223 | 1/2002 |

OTHER PUBLICATIONS

Blindsight Projects [online]. Copyright © 1997-2004 The Blindsight Corporation [retrieved on Aug. 17, 2006]. Retrieved from the Internet: <URL:http://web.archive.org/web/20050309005729/www.blindsight.com/projects.html>.

(Continued)

*Primary Examiner* — Gregory M Desire
(74) *Attorney, Agent, or Firm* — Fish & Richardson P.C.

(57) ABSTRACT

Methods, systems, and apparatus including computer program products for using extracted image text are provided. In one implementation, a computer-implemented method is provided. The method includes receiving an input of one or more image search terms and identifying keywords from the received one or more image search terms. The method also includes searching a collection of keywords including keywords extracted from image text, retrieving an image associated with extracted image text corresponding to one or more of the image search terms, and presenting the image.

19 Claims, 9 Drawing Sheets

Related U.S. Application Data continuation of application No. 13/620,944, filed on Sep. 15, 2012, now Pat. No. 8,744,173, which is a continuation of application No. 13/350,726, filed on Jan. 13, 2012, now Pat. No. 8,503,782, which is a division of application No. 11/479,155, filed on Jun. 29, 2006, now Pat. No. 8,098,934.

(51) Int. Cl.
| | |
|---|---|
| *G06K 9/36* | (2006.01) |
| *G06T 3/40* | (2006.01) |
| *G06T 11/60* | (2006.01) |
| *G06K 9/46* | (2006.01) |
| *G06K 9/52* | (2006.01) |
| *G06T 7/00* | (2006.01) |

(52) U.S. Cl.
CPC ........... *G06T 3/4053* (2013.01); *G06T 7/0028* (2013.01); *G06T 11/60* (2013.01); *G06K 2009/4666* (2013.01); *G06K 2209/01* (2013.01)

(56) References Cited

U.S. PATENT DOCUMENTS

| | | | |
|---|---|---|---|
| 6,014,450 | A | 1/2000 | Heilper et al. |
| 6,084,989 | A | 7/2000 | Eppler |
| 6,266,442 | B1 | 7/2001 | Laumeyer et al. |
| 6,298,151 | B1 | 10/2001 | Jodoin et al. |
| 6,363,161 | B2 | 3/2002 | Laumeyer et al. |
| 6,449,384 | B2 | 9/2002 | Laumeyer et al. |
| 6,453,056 | B2 | 9/2002 | Laumeyer et al. |
| 6,473,522 | B1 | 10/2002 | Lienhart et al. |
| 6,608,930 | B1 | 8/2003 | Agnihotri et al. |
| 6,621,941 | B1 | 9/2003 | Syeda-Mahmood et al. |
| 6,625,315 | B2 | 9/2003 | Laumeyer et al. |
| 6,738,512 | B1 | 5/2004 | Chen et al. |
| 6,739,512 | B2 | 5/2004 | Guerrero et al. |
| 6,937,766 | B1 | 8/2005 | Wilf et al. |
| 7,092,548 | B2 | 8/2006 | Laumeyer et al. |
| 7,106,913 | B2 | 9/2006 | Castorina et al. |
| 7,403,657 | B2 | 7/2008 | Nagasaka et al. |
| 7,444,003 | B2 | 10/2008 | Laumeyer et al. |
| 7,447,382 | B2 | 11/2008 | Nestares et al. |
| 7,451,041 | B2 | 11/2008 | Laumeyer et al. |
| 7,570,816 | B2 | 8/2009 | Bargeron et al. |
| 7,590,310 | B2 | 9/2009 | Retterath et al. |
| 7,613,363 | B2 | 11/2009 | Platt et al. |
| 7,760,917 | B2 | 7/2010 | Vanhoucke et al. |
| 7,809,722 | B2 | 10/2010 | Gokturk et al. |
| 7,899,247 | B2 | 3/2011 | Ohk et al. |
| 7,953,295 | B2 | 5/2011 | Vincent et al. |
| 7,957,596 | B2 | 6/2011 | Ofek et al. |
| 9,269,013 | B2 * | 2/2016 | Vincent ............... G06K 9/3258 |
| 2002/0018138 | A1 | 2/2002 | Yoshiro |
| 2002/0057848 | A1 | 5/2002 | Tan et al. |
| 2002/0122590 | A1 | 9/2002 | Kaneda |
| 2002/0159636 | A1 | 10/2002 | Lienhart et al. |
| 2003/0198386 | A1 | 10/2003 | Luo |
| 2003/0200507 | A1 | 10/2003 | Stern et al. |
| 2004/0207759 | A1 | 10/2004 | Li et al. |
| 2005/0010602 | A1 | 1/2005 | Loui et al. |
| 2005/0078190 | A1 | 4/2005 | Bloom et al. |
| 2005/0259866 | A1 | 11/2005 | Jacobs et al. |
| 2005/0265633 | A1 | 12/2005 | Piacentino et al. |
| 2006/0029294 | A1 | 2/2006 | Akiyoshi et al. |
| 2006/0074771 | A1 | 4/2006 | Kim et al. |
| 2006/0222239 | A1 | 10/2006 | Bargeron et al. |
| 2007/0081744 | A1 | 4/2007 | Gokturk et al. |
| 2007/0209025 | A1 | 9/2007 | Jing et al. |
| 2008/0002893 | A1 | 1/2008 | Vincent et al. |
| 2008/0002914 | A1 | 1/2008 | Vincent et al. |
| 2008/0002916 | A1 | 1/2008 | Vincent et al. |
| 2009/0018990 | A1 | 1/2009 | Moraleda |
| 2014/0270549 | A1 | 9/2014 | Vincent et al. |

OTHER PUBLICATIONS

Boujou three [online]. Copyright © 2004 2D3 Limited [retrieved on Aug. 17, 2006]. Retrieved from the Internet: <http://web.archive.org/web/20041014191922/www.2d3.com/jsp/products/product-overview.jsp?product=10>.

Chen, X., and Yuille, A.L. (2004). Detecting and Reading Text in Natural Scenes. IEEE, 2:II-366-II-373.

Freund, Y., and Schapire, R.E. (1996). Experiments with a New Boosting Algorithm. Proc. of 13th International Conference on Machine Learning, pp. 148-156.

Hadhoud et al. *New Trends in High Resolution Image Processing,* IEEE (2004) pp. 2-23.

International Search Report and Written Opinion, PCT/US2007/072578, Mar. 18, 2008.

International Preliminary Report on Patentability for PCT International Application PCT/US2007/072578, dated Jan. 6, 2009, 11 pages.

Invitation to Pay Additional Fees and Partial International Search Report, PCT/US2007/072578, Nov. 30, 2007, 10 pages.

Ju, S.X., et al. (1996). Cardboard People: A Parameterized Model of Articulated Image Motion. IEEE, pp. 38-44.

Niblack, W. (1986). An Introduction to Digital Image Processing, Prentice Hall, Englewood Cliffs, NJ; pp. 115 and 116.

Sato et al. *Video OCR for Digital News Archive,* IEEE (1997) pp. 52-60.

StreetView [online]. Copyright © 2003 City [retrieved on Aug. 17, 2006]. Retrieved from the Internet: <http://web.archive.org/web/20040203134104/www.atcity.com/index.html>.

Trier, Ø.D., et al. (1996). Feature Extraction Methods for Character Recognition—a Survey. Pattern Recognition, 29(4):641-662.

Viola, P., and Jones, M.J. (2001). Robust Real-time Object Detection. Cambridge Research Laboratory, Technical Report Series, pp. 1-24.

Wu, V., et al. (1997). Automatic Text Detection and Recognition. Proc. of Image Understanding Workshop, pp. 707-712.

Xi, J., et al. (2001). A Video Text Detection and Recognition System. IEEE, pp. 1080-1083.

Myers et al., "Recognition of Text in 3-D Scenes," SRI International, Menlo Park, CA, published Dec. 8, 2004, 15 pages.

"Korean Intellectual Property Office Notice of Preliminary Rejection" for Application No. 2009-7001863, dated Aug. 20, 2013, 5 pages.

* cited by examiner

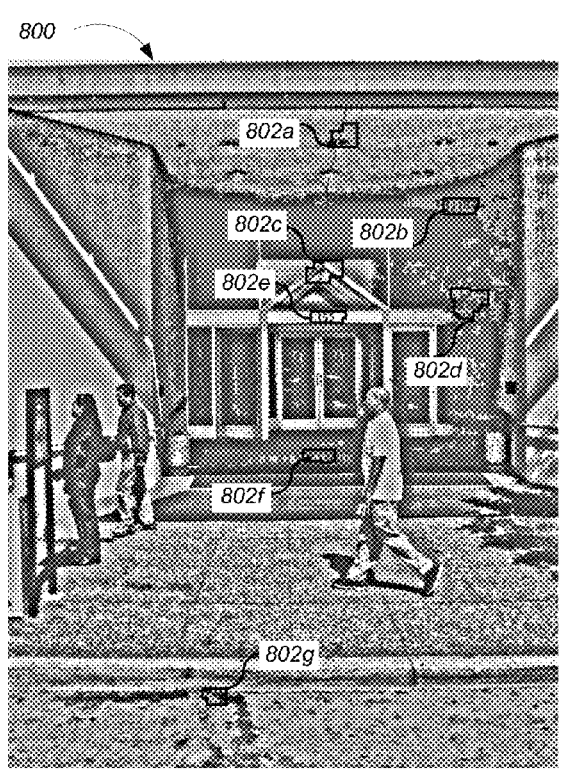
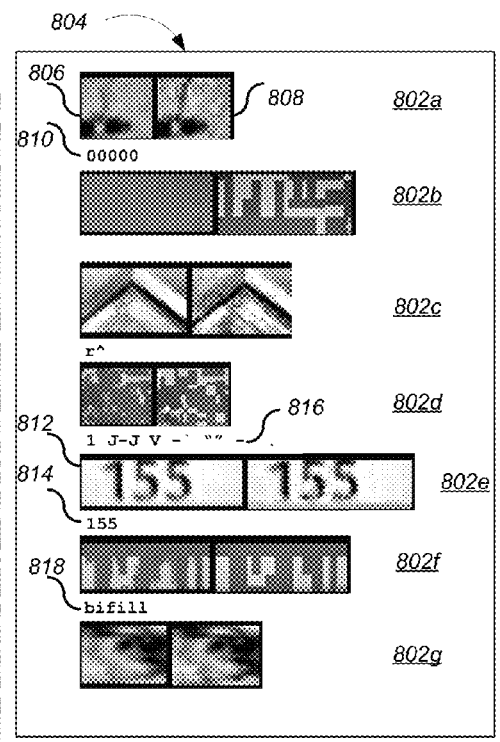
FIG. 8A
FIG. 8B

USING EXTRACTED IMAGE TEXT

CROSS-REFERENCE TO RELATED APPLICATIONS

This application is a continuation application of, and claims priority to U.S. patent application Ser. No. 14/291,331, filed on May 30, 2014, which is a continuation application of, and claims priority to, U.S. patent application Ser. No. 13/620,944, now U.S. Pat. No. 8,744,173, filed on Sep. 15, 2012, which is a continuation application of, and claims priority to, U.S. patent application Ser. No. 13/350,726, now U.S. Pat. No. 8,503,782, filed on Jan. 13, 2012 entitled, "USING EXTRACTED IMAGE TEXT," which is a divisional application of, and claims priority to, U.S. patent application Ser. No. 11/479,155, now U.S. Pat. No. 8,098,934, filed on Jun. 29, 2006, entitled, "USING EXTRACTED IMAGE TEXT." The disclosure of the foregoing applications is incorporated herein by reference.

BACKGROUND

The present disclosure relates to image processing for recognizing text within images.

Digital images can include a wide variety of content. For example, digital images can illustrate landscapes, people, urban scenes, and other objects. Digital images often include text. Digital images can be captured, for example, using cameras or digital video recorders.

Image text (i.e., text in an image) typically includes text of varying size, orientation, and typeface. Text in a digital image derived, for example, from an urban scene (e.g., a city street scene) often provides information about the displayed scene or location. A typical street scene includes, for example, text as part of street signs, building names, address numbers, and window signs.

An example street scene 100 is shown in FIG. 1. Street scene 100 includes textual elements such as logo text 102 on an automobile as well as building signs 104 and 106. Text found within images can identify address locations, business names, and other information associated with the illustrated content.

The text within images can be difficult to automatically identify and recognize due both to problems with image quality and environmental factors associated with the image. Low image quality is produced, for example, by low resolution, image distortions, and compression artefacts. Environmental factors include, for example, text distance and size, shadowing and other contrast effects, foreground obstructions, and effects caused by inclement weather.

SUMMARY

Systems, methods, and apparatus including computer program products for text identification and recognition in images are described. Text recognition and extraction from an image includes preprocessing a received image, identifying candidate text regions within the image, enhancing the identified candidate text regions, and extracting text from the enhanced candidate text regions using a character recognition process. For an image showing an urban scene, such as a portion of a city block, the text recognition process is used to identify, for example, building addresses, street signs, business names, restaurant menus, and hours of operation.

In accordance with one aspect, a computer-implemented method for recognizing text in an image is provided. The method includes receiving a plurality of images. The method also includes processing the images to detect a corresponding set of regions of the images, each image having a region corresponding to each other image region, as potentially containing text. The method further includes combining the regions to generate an enhanced region image and performing optical character recognition on the enhanced region image.

In accordance with one aspect, a computer-implemented method for recognizing text in an image is provided. The method includes receiving an image and processing the image to divide the image into one or more regions. The method includes detecting one or more features in each region and determining for each region whether it is a candidate text region potentially containing text using the detected features. The method further includes enhancing the candidate text regions to generate an enhanced image and performing optical character recognition on the enhanced image In accordance with one aspect, a system is provided. The system includes means for receiving a plurality of images and means for processing the images to detect a corresponding set of regions of the images as potentially containing text. The system also includes means for combining the regions to generate an enhanced region image and means for performing optical character recognition on the enhanced region image.

In accordance with one aspect, a system is provided. The system includes means for receiving an image and means for processing the image to divide the image into one or more regions. The system includes means for detecting one or more features in each region and means for determining for each region whether it is a candidate text region potentially containing text using the detected features. The system also includes means for enhancing the candidate text regions to generate an enhanced image and means for performing optical character recognition on the enhanced image.

In accordance with one aspect, a method is provided. The method includes receiving an input of one or more image search terms identifying keywords from the received one or more image search terms. The method includes searching a collection of keywords including keywords extracted from image text. The method further includes retrieving an image associated with extracted image text matching a search term and presenting the image.

In accordance with one aspect, a method is provided. The method includes receiving an image including data identifying a location associated with the image and extracting text from within the image. The method includes indexing the extracted text and receiving a request and using the extracted text to determine that the image satisfies the request. The method further includes presenting information including the image to a user in response to the request.

In accordance with one aspect, a system is provided. The system includes means for receiving an input of one or more image search terms and means for searching a collection of keywords including keywords extracted from image text. The system also includes means for retrieving an image associated with extracted image text matching a search term and means for presenting the image.

In accordance with one aspect, as system is provided. The system includes means for receiving an image including data identifying a location associated with the image and a means for extracting text from within the image. The system includes means for indexing the extracted text and means for receiving a request and using the extracted text to determine that the image satisfies the request. The system also includes means for presenting information including the image to a user in response to the request.

In accordance with another aspect, a method is provided. The method includes receiving a plurality of images including a version of an identified candidate text region. The method includes aligning each candidate text region image from the plurality of images to a high resolution grid. The method further includes compositing the aligned candidate text regions to create a single superresolution image and performing character recognition on the superresolution image to identify text.

In accordance with one aspect, a system is provided. The system includes means for receiving a plurality of images each including a version of an identified candidate text region. The system includes means for aligning each candidate text region from the plurality of images to a high resolution grid. The system also includes means for compositing the aligned candidate text regions to create a single superresolution image and means for performing character recognition on the superresolution image to identify text.

Particular embodiments of the invention can be implemented to realize one or more of the following advantages. Candidate text regions within images can be enhanced to improve text recognition accuracy. Extracted image text can also be used to improve image searching. The extracted text can be stored as associated with the particular image for use in generating search results in an image search. Additionally, the extracted image text can be combined with location data and indexed to improve and enhance location-based searching. The extracted text can provide keywords for identifying particular locations and presenting images of the identified locations to a user.

The details of one or more embodiments of the invention are set forth in the accompanying drawings and the description below. Other features, aspects, and advantages of the invention will become apparent from the description, the drawings, and the claims.

BRIEF DESCRIPTION OF THE DRAWINGS

FIG. 8A is an image including candidate text regions.

FIG. 8B shows the results of a character recognition operation for the candidate text regions of FIG. 7A.

Like reference numbers and designations in the various drawings indicate like elements.

DETAILED DESCRIPTION

Architecture

Figure 1:
FIG. 1 shows an image that includes textual elements.
Figure 2:
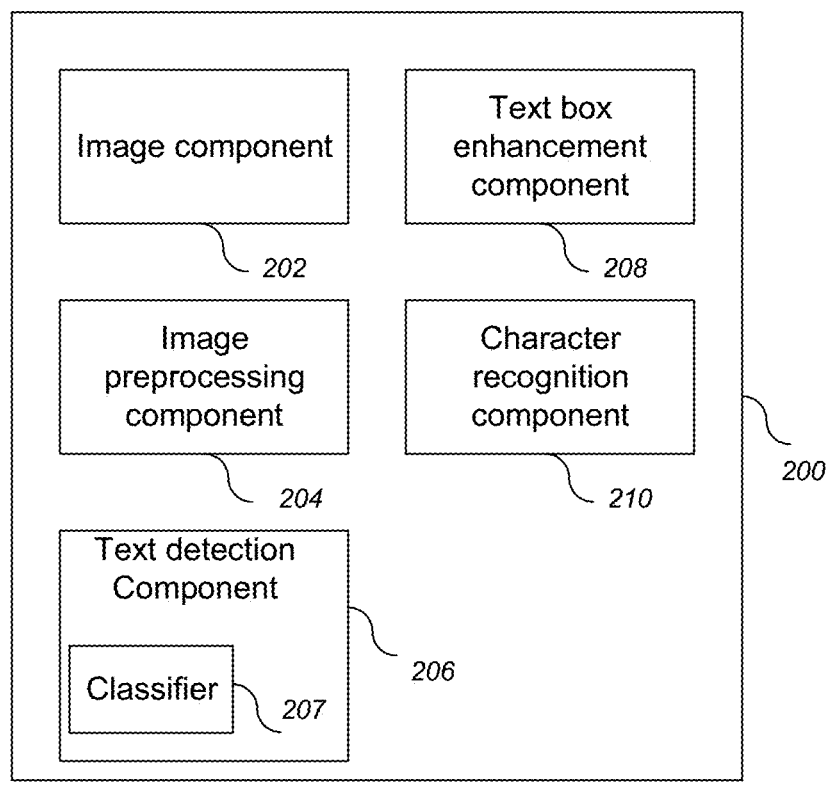
FIG. 2 is a block diagram of an example text recognition system.

FIG. 2 is a block diagram of an example text recognition system 200. The text recognition system 200 includes an image component 202, an image preprocessing module 204, a text detection component 206, a text box enhancement component 208, and character recognition component 210.

Image component 202 collects, stores, or otherwise manages one or more images for text recognition. Image component 202 can include one or more image databases or can retrieve images from a data store such as one or more remote image databases. Alternatively, the image component 202 can receive images for text recognition in realtime from a remote location, for example, as part of an image or video feed. The process of collecting and storing images can be automated or user driven. The images can be retrieved, for example, as a result of a user input selecting one or more images for use in the text recognition process.

Image preprocessing component 204 provides an optional level of initial processing for the images provided by the image component 202. The image preprocessing enhances the images prior to text detection by the text detection component 206. In one implementation, the image preprocessing component 204 first analyzes each image to determine whether or not preprocessing of the image is necessary. Alternatively, every image is automatically preprocessed by the image preprocessing component 204.

Preprocessing is performed on an image, for example, when the image includes regions of low contrast. Photographic images, for example, are subject to environmental conditions affecting image contrast such as changes in lighting conditions or shadows generated by physical objects. For example, a tree in the foreground of an image can cast a shadow over a portion of text, reducing contrast between the text and the surrounding features in the image. Additionally, or alternatively, in another implementation, preprocessing is performed to correct image quality problems, for example, the presence of compression artefacts.

Text detection component 206 detects candidate regions of an image that contains text or is likely to contain text. The text in the candidate text regions are then identified by character recognition component 210. The text identifier component 206 includes a classifier 207 configured to detect the presence of text within an image. The classifier is trained to detect candidate text regions using feature detection. The candidate text regions detected by the text detection component 206 are further processed by the text box enhancement component 208.

Text box enhancement component 208 enhances the candidate text regions of the image detected by the text detection component 206. The candidate text regions are enhanced to increase the accuracy of text identification by the character recognition component 210. In one implementation, the candidate text regions are enhanced by performing a superresolution operation to generate a single superresolution image from a number of separate images. The superresolution process is described below.

In another implementation, an inverse (or negative) version of each candidate text region is generated. The inverse version changes, for example, white text into black text in order to improve text identification using a character recognition application calibrated for recognizing dark text on a light background.

Character recognition component 210 analyzes the enhanced candidate text box regions to identify and extract text. The character recognition component 210 applies a character recognition program (e.g., an optical character recognition ("OCR") program) to identify alphanumeric characters within the text box regions and to extract the identified characters. Identified characters can be further processed, for example, to eliminate nonsense results generated by the character recognition program in an attempt to identify text from non-text features in a candidate text region.

Text Recognition Process

Figure 3:
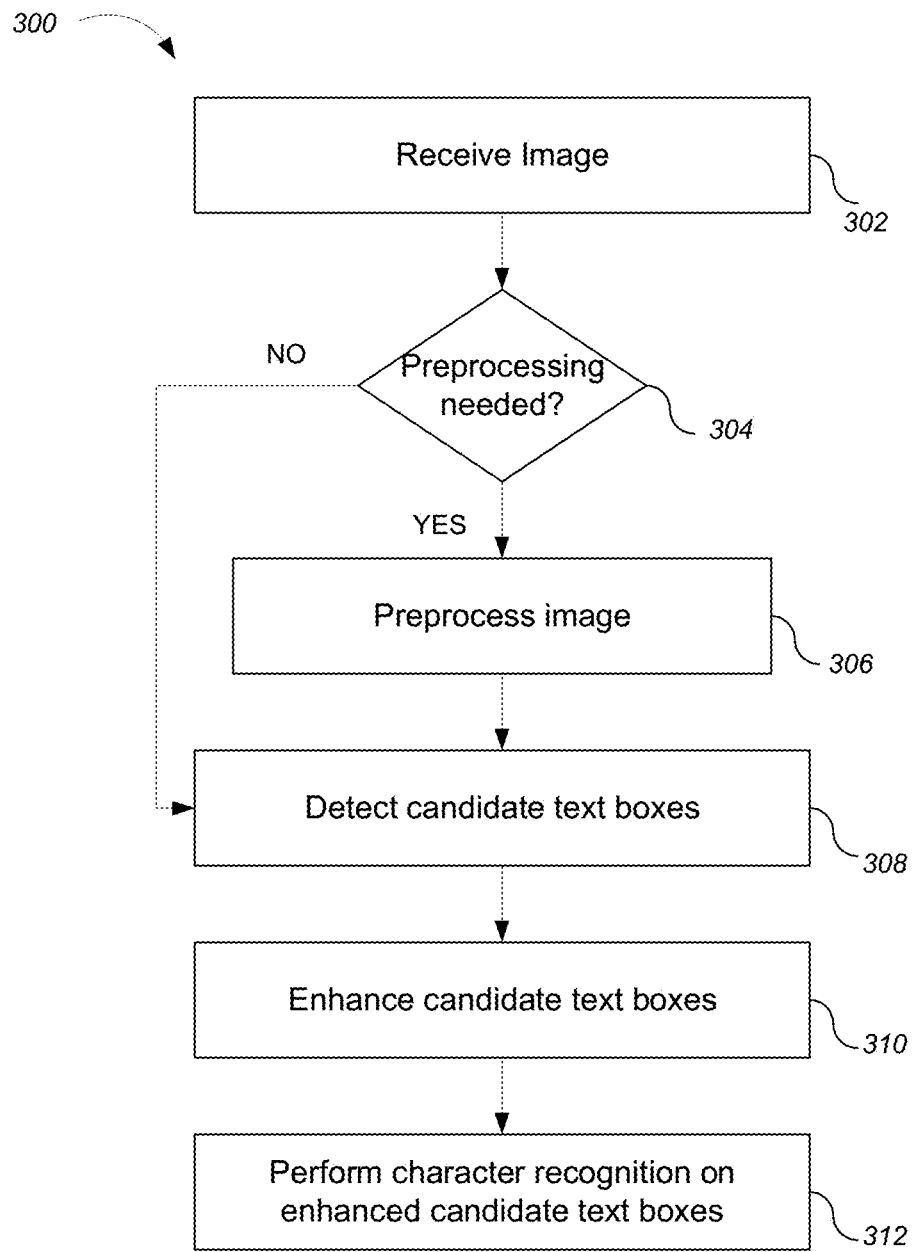
FIG. 3 shows an example process for recognizing text in an image.

FIG. 3 shows an example process 300 for recognizing text in an image. Process 300 can be initiated, for example, by a user or can be a component of an automated system for processing images.

Image Collection

The first step in the text recognition process 300 is to receive one or more images (e.g., from the image component 202) (step 302). The images can be received from numerous sources including local storage on a single computer or multiple computing devices distributed across a network. For example, the images can be retrieved from one or more, local or remote, image databases or can be collected in realtime for processing.

The received images may have been captured, for example, using conventional digital cameras or video recording devices. The resulting captured images can include panoramic images, still images, or frames of digital video. The captured images can also be associated with three-dimensional ranging data as well as location information, which can be used in processing the images.

An example image type is a panoramic image of a street scene. A single panoramic image can capture multiple street addresses (e.g., one city block, or a string of contiguous address locations on a street). Such panoramic pictures are taken, for example, using a panoramic camera or a regular camera equipped with a panoramic lens. Alternatively, a pushbroom panoramic image can be generated for a street scene by merging a sequence of discrete images collected, for example, from a moving camera.

Location data can be associated with each image. For example, the GPS coordinates at every point along a given panoramic image can be known or accurately calculated using an appropriate technique. For example, for a panoramic picture corresponding to a block from "100" to "200" on a given street, where the GPS location at either end of the block is known (e.g., based on GPS receiver data taken at the time of image capture), then the GPS coordinates can be calculated at every intermediate point using linear interpolation. Consequently, GPS coordinates can be determined for each corresponding location in the panoramic image.

In an alternative implementation, a set of GPS coordinates are known for each image, corresponding to the exact location where each image was captured. For example, if each image corresponds to one particular street address, then given a series of such image/GPS data pairs, exact GPS coordinates are known for each corresponding address location on that street.

Additionally, exact GPS coordinates of every image or vertical line in an image can be determined. For example, a differential GPS antenna on a moving vehicle can be employed, along with wheel speed sensors, inertial measurement unit, and other sensors, which together allow a very accurate GPS coordinate to be computed for each image or portions of the image.

Image Preprocessing

The received images may need preprocessed in order to increase the probability of detecting text within the images. For example, text in an image from a street scene can be located within a shadow (e.g., cast by a tree). The shadow results in a region of low contrast between the text and the surrounding image features. The low contrast increases the difficulty in distinguishing the text from background features surrounding the text.

In one implementation, a determination is made as to whether the images are to be preprocessed (step 304). In making the preprocessing determination, the image source can be considered. For example, images taken of a city street may have a higher need for preprocessing then other images taken, for example, within a store where environmental (e.g., lighting) conditions are more controlled. Similarly, high resolution images are less in need of preprocessing as compared to low resolution images. Additionally, the source of the images can be used to determine the particular type of preprocessing to perform on an image. For example, an image encoded in a format having fewer artefacts (e.g., compression artefacts) may require less preprocessing. However, in an alternative implementation, all images are automatically preprocessed (or not preprocessed at all) without the determination step 304, for example, to expedite processing or because of known information regarding a particular set of images.

Each designated image is preprocessed (e.g., using image preprocessing component 204) (step 306). In one implementation, a normalization process is performed on each image. Normalization of the image is performed to enhance the contrast in the image, in particular between the text and background in low-contrast regions of the image. One example normalization process is adaptive gray value normalization. In adaptive gray value normalization, a mean and variance for each pixel in the image is computed. The pixel values are mapped to new pixel values according to a predetermined mean and standard deviation value. A minimum standard deviation value can be selected to prevent contrast over enhancement in areas of the image having a low variance.

Figure 4A:
FIG. 4A shows an image before a normalizing operation.
Figure 4B:
FIG. 4B shows the image of FIG. 4A after normalization.

FIG. 4A shows an example image 400 prior to normalization. The image 400 includes text 402. The text 402 is located in a region of low contrast between the text 402 and the region surrounding the text 402. FIG. 4B shows a normalized image 404. The normalized image 404 represents the image 400 following the normalization process. The text 402 in the normalized image 404 has a greater contrast such that the text 402 is more easily discernable from the surrounding image.

Other preprocessing operations can be performed. In one implementation, a high dynamic range process is performed (instead of, or in addition to, normalization) to preprocess the images. Multiple exposures of an image are used in the high dynamic range processes to create a high dynamic range image. For example, three exposures ranging from bright to medium to dark exposure can be captured by a camera. To create the high dynamic range image, the three exposures are composited to create a single image. Like normalization, the high dynamic range process also provides an image with enhanced contrast, including text regions, which increases the ability to distinguish the text from the surrounding background features.

The images can also be processed to correct for various image distortions. For example, the images can be processed to correct for perspective distortion. Text positioned on a plane that is not perpendicular to the camera is subject to perspective distortion, which can make text identification more difficult. Conventional perspective distortion correction techniques can be applied to the images during preprocessing.

Text Detection

The images are processed for text detection (e.g., using text detection component 206) (step 308). During text detection processing, candidate text regions of the image are detected as possibly containing text. A classifier is used to detect the candidate text regions. An existing or new classifier is trained to identify features in an image that indicate, within some degree of confidence, the presence of text. A set of sample text and non-text patterns is used to train the classifier. The classifier is trained to distinguish between text and non-text image features based on the set of sample patterns. To increase the accuracy of the classifier, the set of sample patterns used to train the classifier corresponds to images similar to those to be examined. For example, sample patterns derived from images of city street scenes are used when the classifier is being trained to identify candidate text regions in images showing city streets. Different training sets of text and non-text patters can be used when training the classifier to detect text in different types of images. For example, when using a classifier to detect text in images of consumer items located within a store, detect images cataloging museum object, or to detect text in another type of image collection (including personal image collections), different training sets of patterns are used so that the classifier is calibrated to identify text present in that type of image.

The classifier distinguishes between text and non-text in images by analyzing features or combinations of features within the image. A number of different features types can be examined by the classifier for detecting text in the image. Typically, the image is divided into a number of smaller image sub-regions (e.g., squares of 16×16 pixels, rectangles of 40×20 pixels, disks having a 10 pixel radius, etc.), which are then individually processed for feature analysis. The sub-regions can overlap (e.g., by 5 pixels) to increase accuracy of the text detection. For example, two neighboring sub-regions can have 40% of pixels in common.

Extracted features characterize different properties of the image such as line segment properties (e.g., the shape or orientation of line segments) as well as other features such as color or gradients. Table 1 shows a list of feature types which are used by the classifier in one implementation. The classifier is not limited to the features described below, which are illustrative. The results from analyzing one or more features in a particular image sub-region provide an indication as to whether or not the examined image sub-region contains text.

TABLE 1

| Type 0 | The horizontal derivative and its mean in a local, box-shaped surrounding are used as a feature. |
| Type 1 | The vertical derivative and its mean in a local, box-shaped surrounding are used as a feature. |
| Type 2 | The horizontal derivative and its variance in a local, box-shaped surrounding are used as a feature. |

TABLE 1-continued

| Type 3 | The vertical derivative and its variance in a local, box-shaped surrounding are used as a feature. |
| Type 4 | A joint 2-dimensional histogram over a box-shaped surrounding where dimension one is image intensity and dimension two is the gradient strength. |
| Type 5 | The distribution of canny edgels (edge elements found using a Canny edge detector) over four orientations in a local, box-shaped surrounding. |
| Type 6 | A 1-dimensional histogram of the gradient strength. |
| Type 7 | Corners: A measure for strength of corners in a local box-shaped surrounding is used as a feature. Therefore, the minimum eigenvalue image computed by a corner detector (e.g., a Harris Corner operator or Kanade-Lucas-Tomasi operator, which detects corners using a local structure matrix) is used, and its local mean is computed as a feature. |
| Type 8 | The vertical and horizontal projection profiles in a box-shaped surrounding are used as a feature. Extract their variance (or the mean of their derivative). |

The classifier is run for each image sub-region and according to the feature analysis a text/no text determination is made for each image sub-region. Adjacent image sub-regions with detected text are combined to form candidate text regions for the image.

In one implementation, the classifier is calibrated to identify features corresponding to text within a particular text size range. If the classifier is trained to detect text of a particular size, the input image is scaled across a range of steps. The classifier performs text detection at each scaled step searching for text at the trained height. Consequently, a set of scaled images are created for each image (i.e., a pyramid of scaled images) such that the classifier is run multiple times for each image in order to detect differently sized text.

The results for adjacent scale steps can be used to eliminate false positive candidate text regions. The amount of scaling for each step is chosen so that the same candidate text region is detected at more than one step level in the image set (i.e., a stable text region). In other words, the scale step is selected such that the classifier is capable of detecting text at adjacent scale steps. If text is not identified at adjacent scale step, the detection at only one step size is likely a false positive result. Consequently, false positives in the text detection can be reduced by requiring a candidate text region to appear in at least two adjacent scale steps.

Additionally, in one implementation, a minimum size requirement is applied to detected candidate text regions (e.g., the collection of adjacent image regions where the classifier detected text). The minimum size requirement allows for small candidate text regions providing false positive results to the text detector to be eliminated. However, if the minimum size requirement is set too large some valid text will not be detected (false negative results).

Figure 5A:
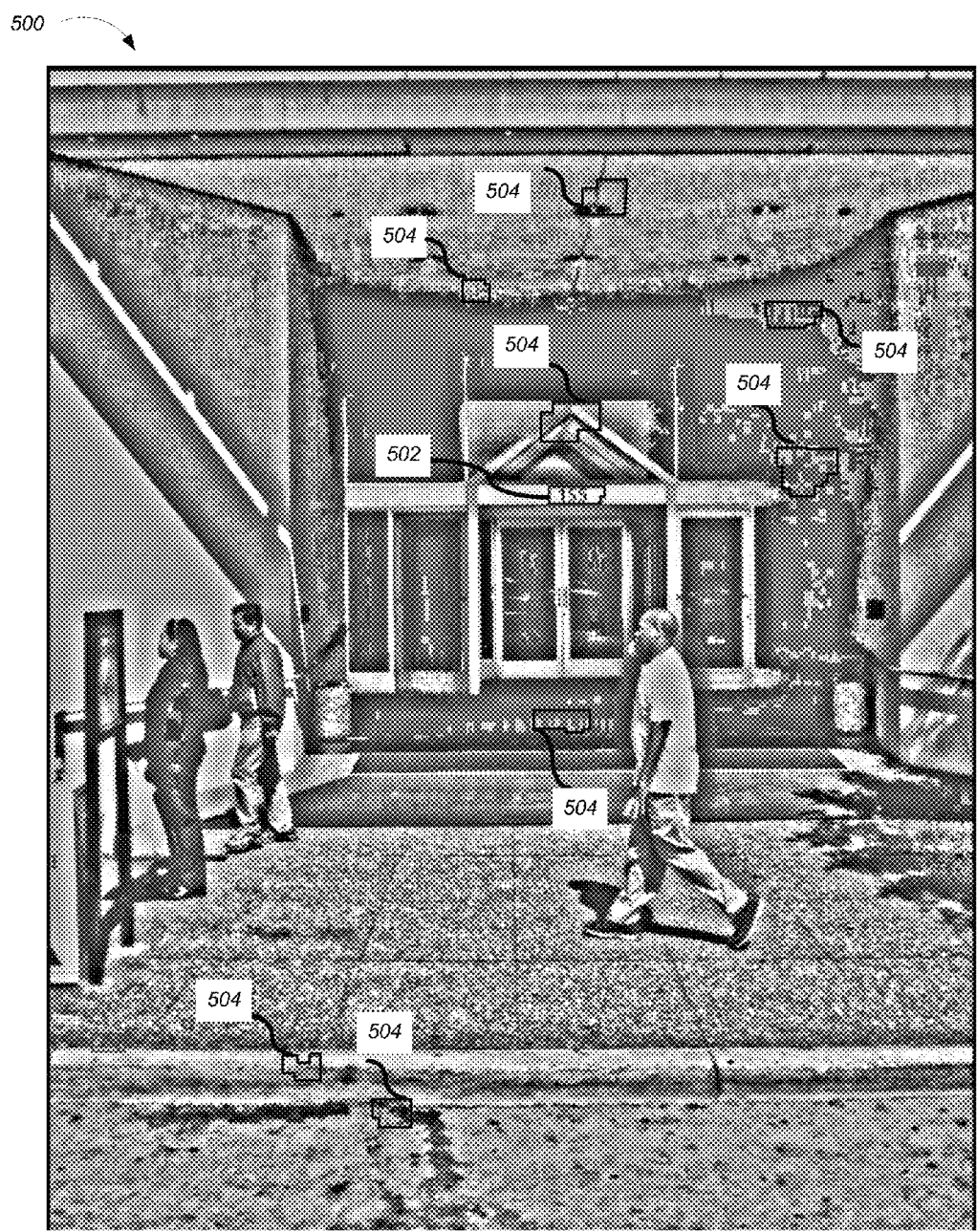
FIG. 5A shows one example of detected candidate text regions for an image.

FIG. 5A shows one example of detected candidate text regions for an image 500 where the classifier has a first minimum size requirement for detected candidate text regions. Image 500 shows a street scene including a building entrance. Within image 500 are a number of detected candidate text regions 502 and 504. The detected candidate text regions represent areas of the image that the classifier determined as potentially having text. As shown in FIG. 5A, the image 500 includes candidate text region 502, which includes the building number "155" above the door of the building. Image 500 also includes candidate text regions 504 representing false positive regions identified as having text.

Figure 5B:
FIG. 5B shows another example of detected candidate text regions for the image.

The number of false positive candidate text regions can be reduced by increasing the minimum size requirement for candidate text regions detected by the classifier. However, increasing the minimum size can also lead to failure in detecting text (i.e., an increased probability of false negatives). FIG. 5B shows an example of the detected candidate text regions for the same image 500 when a larger minimum size requirement is used for detecting candidate text regions. In image 500, fewer candidate text regions 506 have been detected by the classifier. However, the building number "155" is smaller than the minimum candidate text region size and therefore has not been detected. Thus, a particular minimum size requirement for candidate text regions should be selected to minimize false negative results without excessive false positives.

In one implementation, three-dimensional range data associated with an image is used to eliminate false positive candidate text regions. During image collection, range sensors can be used to gather three-dimensional range data for each captured image. For example, the range data can be provided by range sensors such as laser range sensors (e.g., laser detection and ranging ("LIDAR") devices) or stereo-based sensors (i.e., stereoscopic imaging devices) located in proximity to the image capturing device. The three-dimensional range data provides information regarding the distance from the camera position to points in the image. For example, the distance from the camera to a building door or the distance to a foreground object such as a tree or signpost.

The three dimensional range data for points in the image are used to decompose the image into planar and non-planar regions. Planar regions include, for example, building facades where text is often located. The planar map is then compared with the candidate text regions detected by the classifier. Because text lies substantially in a single plane, candidate text regions that are not planar can be eliminated as non-text. Consequently, non-planar candidate text regions are eliminated from further processing, reducing the number of false positive text results. Furthermore, by constraining candidate text regions to planar regions, for example, to planar regions perpendicular to a camera position, other constraints can be relaxed such as the minimum size requirement for candidate text regions.

Additionally, in another implementation, the three-dimensional range data is used to focus the candidate text regions to particular types of text of interest. For example, particular types of text in the image can be targeted such as building names or street signs. The distance provided by the three-dimensional range data can be used to indicate different types of image data such that distance based text detection criteria can be defined. If the camera and rang sensing equipment maintains substantially a same distance from the building facades as it traverses a path down a street, then the three-dimensional range information can be used to locate candidate text regions of satisfying particular distance based criteria. Thus, when looking, for example, for building identifiers (e.g., name, address number), the candidate text regions outside of a predetermined range criteria are eliminated (e.g., removing foreground objects). Alternatively, in an implementation where street signs are targeted for identification, a shorter range value is used to eliminate background candidate text regions.

Output from the text detection process can be provided in several formats. In one implementation, the detected candidate text regions are outlined within the image, as shown in FIG. 5A. Highlighting or other visual cues can be used to distinguish the detected candidate text regions from the rest of the image. Additionally, the coordinates to each candidate text region can be recorded to identify the candidate text regions for subsequent processing as discussed below. Alternatively, a mask is generated for the image such that only the detected text candidates are visible for further processing.

Candidate Text Enhancement

A number of factors can contribute to making the characters of image text difficult to identify. Image text can be small, blurred, have various distortions, or suffer from different artefacts, making character recognition difficult. Referring back to FIG. 3, following text detection, operations are performed to enhance the detected candidate text regions to improve the identification and extraction of text within the candidate text regions (e.g., using the text box enhancement component 208) (step 310). In one implementation, image enhancement is provided by performing a superresolution process on each candidate text region within the image.

The superresolution process uses multiple images of a scene. Each image includes a version of a candidate text region representing the same text from the scene (e.g., several images of a scene from slightly different perspectives). For images derived from film or from a high speed camera that is moving relative to the target scene, multiple images are generated with slight variability due to the change in camera position. For example, a high speed camera taking images as a machine (e.g., a motorized vehicle) can traverse a street perpendicular to the target structures. The high speed camera can therefore capture a sequence of images slightly offset from each previous image according to the motion of the camera. Thus, by having multiple versions of a candidate text region, the resolution of the candidate text region can be improved using the superresolution process. Additionally, a candidate text region that is partially obstructed from one camera position may reveal the obstructed text from a different camera position (e.g., text partially obscured by a tree branch from one camera position may be clear from another).

Figure 6:
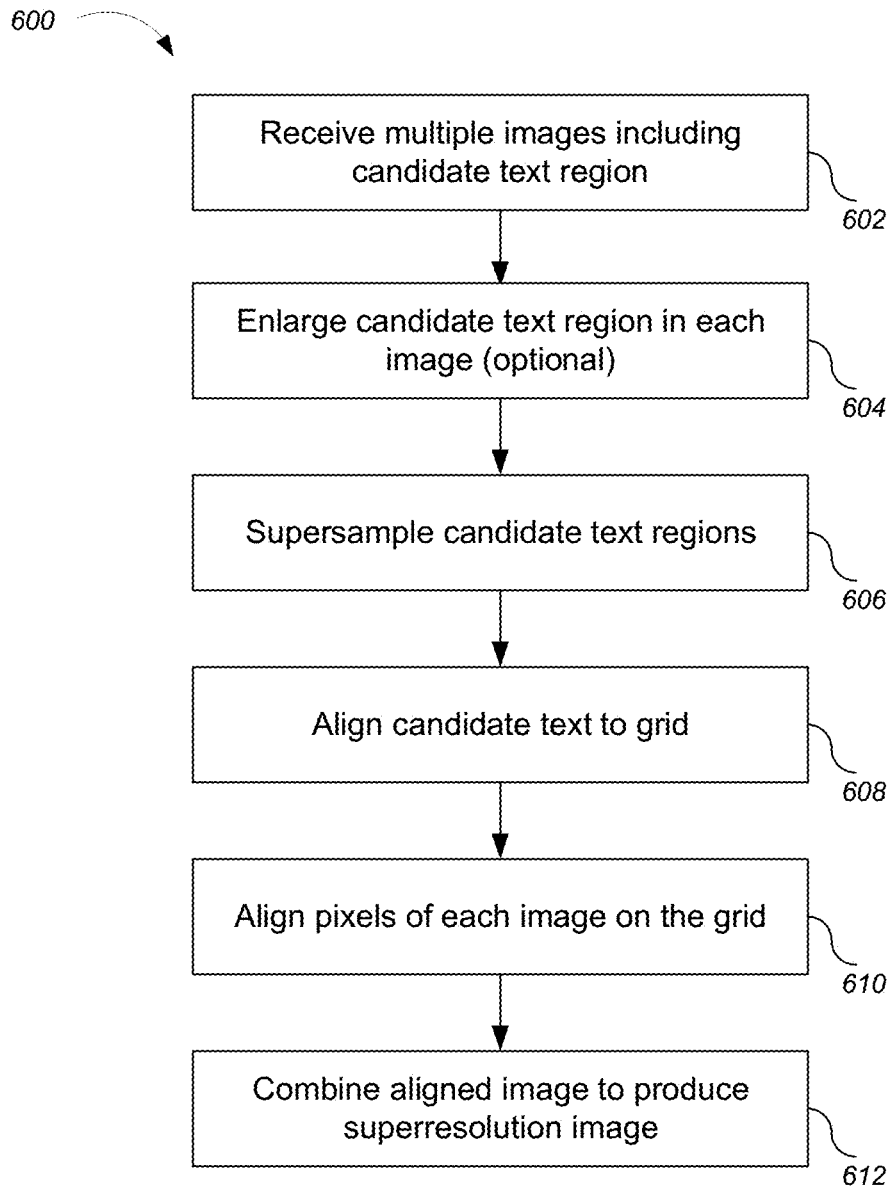
FIG. 6 shows an example process for generating a superresolution result.

The detected candidate text regions from a number of images that include the same text can be combined using the superresolution process to provide an enhanced candidate text region. FIG. 6 is an example process 600 for generating a superresolution image that provides an enhanced candidate text region. A number of frames or consecutive images are extracted (step 602). The number of extracted images depends on the capture rate of the camera as well as the number of images. Typically, a greater number of images leads to a higher quality superresolution result.

Figure 7A:
FIG. 7A shows a set of regions, including text, extracted from multiple images of a scene.

The candidate text regions from each extracted image are optionally enlarged to compensate for text detection errors (step 604) (i.e., to include text which may extend beyond the candidate text region detected by the classifier). FIG. 7A shows a set of similar images extracted for superresolution. Specifically, FIG. 7A shows a collection 700 of slightly different images 702, 704, 706, 708, and 710, each image including the same street sign for the street "LYTTON".

Figure 7B:
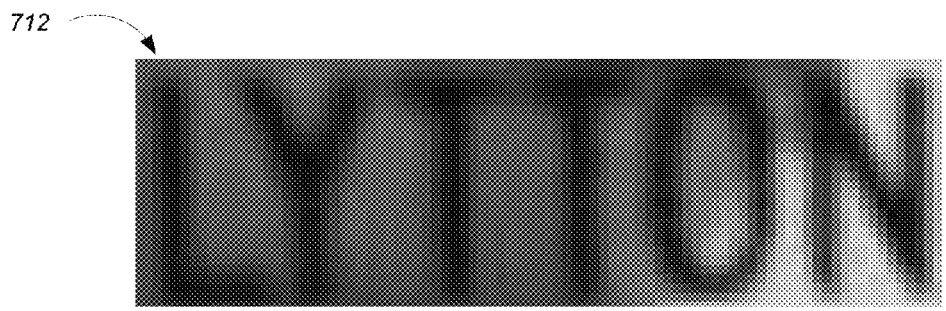
FIG. 7B shows a scaled up version of the text from an image shown in FIG. 7A.

The candidate text regions are scaled up, or supersampled, to a high resolution image (step 606). The high resolution scaling is performed using bicubic splines; however, other scaling techniques can be used. FIG. 7B shows a scaled up version 712 of the text.

Figure 7C:
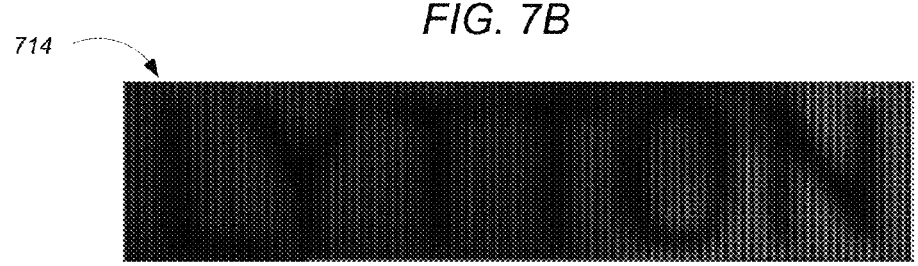
FIG. 7C shows the scaled up candidate text from FIG. 7B aligned to a high resolution grid.
Figure 7D:
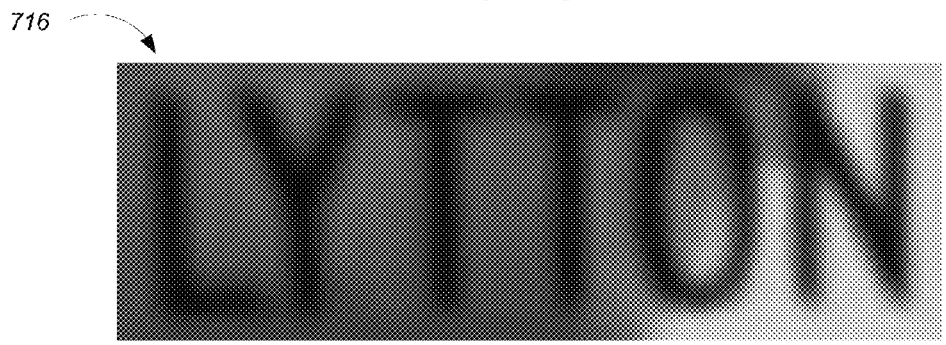
FIG. 7D shows a superresolution result.

The candidate text regions for each image are positioned on a high resolution grid (step 608). FIG. 7C shows the supersampled text aligned to a high-resolution grid 714. The scaled up text from each image is aligned to the high-resolution grid such that the pixels of each image match (step 610). In one implementation, block matching (e.g., hierarchical block matching) is used to align the pixels within the high resolution grid 714. Additionally, an interpolation process can be performed in order to fill in any remaining grid pixels. The resulting aligned pixels are then combined to produce the superresolution image (step 612). For example, combining the pixels can include taking the median value of each pixel for each image in the grid and combining the pixel values to produce the resultant superresolution image. FIG. 7D shows a final superresolution image 716, which provides an enhanced image version over the scaled image 712 shown in FIG. 7B.

Other processing can be performed on the candidate text regions to improve the identification of any text within the regions. In one implementation, after extracting the images in step 602, the images are corrected for perspective distortion. For example, a text sign can be positioned at an angle relative to the camera, such that perspective distortion can interfere with the alignment of the images where the position of the camera has changed between images.

Three-dimensional range data can also be used to align the images for performing the superresolution process. For example, the three-dimensional range data can identify a planar region at a particular distance from the camera. A candidate text region can also be identified at the same location. Using this information as well as knowledge of how much the camera position has moved between images, the exact location of the candidate text region can be calculated for a sequence of images. Range and movement information can be used to determine the processing necessary to properly align the images. For example, if the motion is small and the range is large, the motion can be approximated to a simple translation. However, if the text is close or the motion is large, more complex processing can be necessary. Additionally, the number of images used for superresolution processing can be adjusted depending on the range of the text and the motion of the camera (e.g., use more images when the text is close or motion is great in order to compensate for the additional processing required).

In another implementation, additional normalization or image enhancement processes are performed or images can be upscaled without the multiple images necessary for generating a superresolution image.

Text Identification

Referring back to FIG. 3, after enhancement, a character recognition process is performed on the enhanced candidate text regions (e.g., using character recognition component 210) (step 312). In one implementation, the character recognition process is performed using an available character recognition application, for example, an optical character recognition ("OCR") application. In an alternative implementation, a character recognition application is built specifically to identify text in images.

The character recognition component is provided with two versions of each enhanced candidate text region. The first version is the enhanced candidate text region as generated above. The second version of the enhanced candidate text region is an inverted version. Since character recognition applications are typically designed to identify black text on a white background, providing an inverted version as well as the original version compensates for the use of white text in the candidate text regions (e.g., white lettering on a dark background).

FIG. 8A shows an image 800 including detected candidate text regions 802a-f. FIG. 8B shows corresponding character recognition results 804 for the candidate text regions 802a-f. In FIG. 8B, each of the detected candidate text region 802a-f is shown with the superresolution result and the super-sampled result. Additionally, the text identified from each candidate text region by the character recognition process is displayed. For example, candidate text region 802a (FIG. 8A) is shown with a simplified example superresolution version 806 and scaled up version 808 (FIG. 8B). The two versions are provided as a comparison between the enhancement provided by the superresolution process and simply scaling the candidate text region.

The superresolution version 812 is also shown for the candidate text region 802e. Candidate text region 802e is the candidate text region that includes the building number "115". The character recognition program provided the correct result 814 from the superresolution version 812. False text results are also identified, for example, the character recognition result 810 shows identified text from the candidate text region 802a as "00000".

Following the character recognition process, further filtering can be performed on the detected results in order to remove erroneously identified text such as result 810. For example, the results can be filtered to remove nonsense results such as result 816 and non-word result 818 ("bifill").

In one implementation, the character recognition process is constrained according to values in a database. Database assisted character recognition is disclosed in commonly-owned co-pending U.S. patent application Ser. No. 11/305,694 filed on Dec. 16, 2005, and entitled "Database Assisted OCR for Street Scenes," which is hereby incorporated by reference.

In one implementation, the character recognition is constrained by particular business names within a database. For instance, the character recognition process constrained to look for McDonalds, Fry's Electronics, H&R Block, and Pizza Hut, within the images. The character recognition process can alternatively be constrained, for example, by identifying the type of store or stores within a target address range known for the image, for example, based on a directory listing (e.g., "yellow pages" listing) for that address range (e.g., "bars and restaurants" or "flowers"). In addition, text related to a particular subject category can be obtained, for example, by accessing web sites of stores in that category and adjusting the language model used for character recognition, accordingly.

In one implementation, the constrained character recognition search is carried out using a template matching technique. For instance, suppose that one of the candidate words being searched for in an image is "155" (i.e., the building address number). In this case, a number of bitmap renditions of "155" are generated at various scales and using various fonts. Then, image-based template matching techniques can be used to compare the candidate text region with these various renditions.

In another implementation, the character recognition is constrained by using a "digits only" lexicon or language pack. This limits the search to street numbers only (or other numeric patterns), but because of the constraint introduced, greater accuracy is achieved. In one such embodiment, the image can be binarized using, for example, the Niblack approach (e.g., Wayne Niblack, An Introduction to Image Processing, Prentice-Hall, Englewood Cliffs, N.J., 1986, pp. 115-116, which is herein incorporated in its entirety by reference), and then running a commercial character recognition application (e.g., Abbyy FineReader with a digits-only lexicon). Other such image processing techniques can be used as well.

APPLICATIONS

Indexing

The results of the text recognition can be indexed. The extracted image text is associated with the image, such that the image is identified and retrieved according to the indexed image text. Searching, mapping, or other applications can be used, for example, to provide particular images to a user according to the results of particular user searching criteria.

In one implementation, the extracted text results from text recognition of images derived from street scenes is indexed and associated with a mapping application. A user of the mapping application can search for a location, for example, by business name, address, store hours, or other keywords. In addition to mapping the location for the user, the mapping application can retrieve images matching the user's search. For example, a user enters a search for a McDonald's in a particular city or near a particular address. The mapping application generates a map to the McDonald's as well as presents an image of the McDonald's. The McDonald's image is retrieved using the indexed text from the image identifying the McDonald's and location information associated with the image, which identifies the location of the particular McDonald's in the image.

In another implementation, since the images are associated with location data, the mapping application also provides images of businesses located nearby a searched location, as well as identifying the locations of the businesses on a map. For example a user searching for a particular location or business is provided with search results as well as additional results associated with the location or business. Images of the destination location as well as the associated results are presented to the user. Other information retrieved from the particular images can optionally be presented to the user as well. For example, business hours extracted from the image can be shown.

Additionally, images of similar business as a searched for business can be presented to the user as alternatives. For example, a search for a business of one type can result in images being presented of nearby businesses according to the indexed image text results, providing the user with additional options.

In one implementation, advertisements are presented along with the presented image. For example, an advertisement can be presented for the business identified in the image. Alternatively, one or more advertisements can be presented for alternative businesses. Additionally, the advertisement can be for one or more products associated with the business in the presented image, user search terms, or according to other criteria.

In addition to street scenes, indexing can be applied to other image sets. In one implementation, a store (e.g., a grocery store or hardware store) is indexed. Images of items within the store are captured, for example, using a small motorized vehicle or robot. The aisles of the store are traversed and images of products are captured in a similar manner as discussed above. Additionally, as discussed above, location information is associated with each image. Text is extracted from the product images. In particular, extracted text can be filtered using a product name database in order to focus character recognition results on product names.

An application for searching stores provides a user with location information for desired products. For example, a user inputs a search for a product, for example, by product name, category, or other search criteria. Matching results are presented to the user including location information for each matching product within the store. Consequently, the user can quickly navigate the store to locate and obtain the desired product. Additionally, in another implementation, a number of stores are indexed such that a user searching for a particular product can be provided with the nearest store carrying the desired product in addition to the product's location within the store.

Similarly, in another implementation, an image set associated with one or more museums is indexed. In museums, text associated with exhibits, artefacts, and other displays is often displayed. Images of museum items including the associated text displays are captured as discussed above with respect to indexing a store. As with the store example, location information is associated with each captured image. The text is extracted from the images. Consequently, an application for searching museums provides a user with location information for the various exhibits, artefacts, and other displays in the museum. The user can search for a particular object or use keywords to identify objects associated with an area of interest (e.g., impressionist painting, Greek statues). Alternatively, the user can browse a the museum to learn about the various objects.

Image Searching

Extracted image text can be stored for use an in image search application. Image search applications are used to retrieve and present images for users, for example, according to one or more search terms. Each image is associated with keyword search terms, for example, derived from an image caption, image metadata, text within a predefined proximity of the image, or manual input. Additionally, image search application can include the text extracted from within the images to identify keywords associated with the image. Thus, the text within the image itself can be used as a search parameter.

A search can be initiated by a user providing one or more search terms to the search application. The search terms can be associated with one or more particular keywords. Images associated with the keywords are retrieved and presented to the user.

In one implementation, a particular weighting is be applied to image text. For example, matches to image text can be given greater (or smaller) weight in the search results over text within a caption or otherwise associated with the image, which can be misleading. Alternatively, image text can be used to filter search results to eliminate particular images from a search result according to one or more predefined keywords (e.g., to reduce the retrieval of inappropriate images, spam filtering, etc.).

One or more visual identifiers can be associated with the presented images. For example, the text within the images corresponding to the user's search can be highlighted or visually identified in some other manner (e.g., by underlining, etc.).

Additionally, in one implementation, the image is presented along with one or more advertisements. The advertisements can be selected based on the content of one or more search terms provided by the user.

Embodiments of the invention and all of the functional operations described in this specification can be implemented in digital electronic circuitry, or in computer software, firmware, or hardware, including the structures disclosed in this specification and their structural equivalents, or in combinations of one or more of them. Embodiments of the invention can be implemented as one or more computer program products, i.e., one or more modules of computer program instructions encoded on a computer-readable medium for execution by, or to control the operation of, data processing apparatus. The computer-readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the invention can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the invention can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the invention, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understand as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the invention have been described. Other embodiments are within the scope of the following claims. For example, the actions recited in the claims can be performed in a different order and still achieve desirable results.

What is claimed is:

1. A computer-implemented method comprising:
receiving a plurality of different images of a first scene, wherein each image has a different exposure level;
generating a high dynamic range image using the plurality images;
detecting one or more features in each of one or more regions of the high dynamic range image;
determining for each region of the high dynamic range image whether the region is a candidate text region potentially containing text based on the detected one or more features; and
generating text by performing optical character recognition on a plurality of the regions determined to contain text.

2. The method of claim 1, further comprising:
increasing contrast of the high dynamic range image including normalizing pixel values in the high dynamic range image.

3. The method of claim 2, wherein normalizing pixel values in the high dynamic range image comprises:
computing a mean and variance of pixel values in the high dynamic range image; and
scaling pixel values in the high dynamic range image according to the computed mean and variance.

4. The method of claim 1, further comprising:
generating a superresolution version of the candidate text region.

5. The method of claim 4, wherein generating the superresolution version of the candidate text region comprises:
obtaining a plurality of versions of the candidate text region, each version obtained from a corresponding image of the plurality of images;
aligning the versions of the candidate text region to a high resolution grid; and
compositing the aligned versions of the candidate text region to generate the superresolution version of the candidate text region.

6. The method of claim 5, further comprising:
supersampling the obtained versions of a particular candidate text region from each image of the plurality of images.

7. The method of claim 5, wherein aligning the versions of the candidate text region comprises aligning pixels of the versions of the candidate text region using block matching.

8. The method of claim 5, wherein aligning the versions of the candidate text region comprises:
receiving ranging data and movement information associated with each version of the candidate text region; and
aligning the versions of the candidate text region based at least in part on the received ranging data and movement information.

9. The method of claim 5, wherein compositing the aligned versions of the candidate text region comprises combining pixels from each version of the candidate text region including:
computing a median value of pixels in each version of the candidate region; and
combining the computed median values for corresponding pixels in the aligned versions of the candidate text region.

10. A system, comprising:
one or more processing devices; and
a memory storage apparatus in data communication with the one or more processing devices and storing instructions that cause the one or more processing devices to perform operations comprising:
receiving a plurality of different images of a first scene, wherein each image has a different exposure level;
generating a high dynamic range image using the plurality images;
detecting one or more features in each of one or more regions of the high dynamic range image;
determining for each region of the high dynamic range image whether the region is a candidate text region potentially containing text based on the detected one or more features; and
generating text by performing optical character recognition on a plurality of the regions determined to contain text.

11. The system of claim 10, the operations further comprising:
increasing contrast of the high dynamic range image including normalizing pixel values in the high dynamic range image.

12. The system of claim 11, wherein normalizing pixel values in the high dynamic range image comprises:
computing a mean and variance of pixel values in the high dynamic range image; and
scaling pixel values in the high dynamic range image according to the computed mean and variance.

13. The system of claim 10, the operations further comprising:
generating a superresolution version of the candidate text region.

14. The system of claim 13, wherein generating the superresolution version of the candidate text region comprises:
obtaining a plurality of versions of the candidate text region, each version obtained from a corresponding image of the plurality of images;
aligning the versions of the candidate text region to a high resolution grid; and
compositing the aligned versions of the candidate text region to generate the superresolution version of the candidate text region.

15. The system of claim 14, the operations further comprising:
supersampling the obtained versions of a particular candidate text region from each image of the plurality of images.

16. The system of claim 14, wherein aligning the versions of the candidate text region comprises aligning pixels of the versions of the candidate text region using block matching.

17. The system of claim 14, wherein aligning the versions of the candidate text region comprises:
receiving ranging data and movement information associated with each version of the candidate text region; and
aligning the versions of the candidate text region based at least in part on the received ranging data and movement information.

18. The system of claim 14, wherein compositing the aligned versions of the candidate text region comprises combining pixels from each version of the candidate text region including:
computing a median value of pixels in each version of the candidate region; and combining the computed median values for corresponding pixels in the aligned versions of the candidate text region.

19. A memory storage apparatus storing instructions that cause the one or more processing devices to perform operations comprising:
receiving a plurality of different images of a first scene, wherein each image has a different exposure level;
generating a high dynamic range image using the plurality images;
detecting one or more features in each of one or more regions of the high dynamic range image;
determining for each region of the high dynamic range image whether the region is a candidate text region potentially containing text based on the detected one or more features; and
generating text by performing optical character recognition on a plurality of the regions determined to contain text.

* * * * *